US012697792B2

(12) United States Patent
Nomura

(10) Patent No.: US 12,697,792 B2
(45) Date of Patent: Aug. 4, 2026

(54) METHOD OF PRODUCING SPECTACLE LENS

(71) Applicant: HOYA LENS THAILAND LTD., Pathumthani (TH)

(72) Inventor: Takumi Nomura, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 273 days.

(21) Appl. No.: 18/278,888

(22) PCT Filed: Dec. 28, 2021

(86) PCT No.: PCT/JP2021/048730

§ 371 (c)(1),
(2) Date: Aug. 25, 2023

(87) PCT Pub. No.: WO2022/209093

PCT Pub. Date: Oct. 6, 2022

(65) Prior Publication Data

US 2024/0077754 A1 Mar. 7, 2024

(30) Foreign Application Priority Data

Mar. 30, 2021 (JP) ................................ 2021-058171

(51) Int. Cl.

| | |
|---|---|
| ***B29D 11/00*** | (2006.01) |
| ***C03C 17/36*** | (2006.01) |
| ***G02B 1/18*** | (2015.01) |

(52) U.S. Cl.

CPC ........ *B29D 11/00865* (2013.01); *C03C 17/36* (2013.01); *G02B 1/18* (2015.01)

(58) Field of Classification Search

None

See application file for complete search history.

(56) References Cited

U.S. PATENT DOCUMENTS 5,534,314 A * 7/1996 Wadley .................. C23C 14/30 118/727
2010/0177395 A1* 7/2010 Nishimoto .......... C23C 14/5846 351/159.73

(Continued)

FOREIGN PATENT DOCUMENTS

| | | |
|---|---|---|
| CN | 105861993 A | 8/2016 |
| EP | 4 242 733 A1 | 9/2023 |

(Continued)

OTHER PUBLICATIONS

Communication issued Dec. 24, 2024 in Japanese Application No. 2021-058171.

(Continued)

*Primary Examiner* — James M Mellott
(74) *Attorney, Agent, or Firm* — Sughrue Mion, PLLC

(57) ABSTRACT

There is provided a method of producing a spectacle lens, wherein the spectacle lens has a water-repellent layer, and the method including film-forming the water-repellent layer by a heat deposition method and heating a plurality of deposition sources according to different temperature profiles in the film-forming by the heat deposition method, wherein, in the plurality of deposition sources, at least one deposition source contains a water-repellent component and at least one deposition source contains a metal component.

4 Claims, 3 Drawing Sheets

(56) References Cited

U.S. PATENT DOCUMENTS

| | | | | |
|---|---|---|---|---|
| 2022/0214562 | A1* | 7/2022 | Nomura | G02C 7/022 |
| 2024/0160039 | A1* | 5/2024 | Nomura | G02C 7/02 |
| 2024/0353594 | A1* | 10/2024 | Nomura | C23C 14/083 |

FOREIGN PATENT DOCUMENTS

| | | | |
|---|---|---|---|
| JP | S55159869 | U | 11/1980 |
| JP | S621858 | A | 1/1987 |
| JP | H05112658 | A | 5/1993 |
| JP | 2003014904 | A | 1/2003 |
| JP | 2006-111965 | A | 4/2006 |
| JP | 2006184849 | A | 7/2006 |
| JP | 2007187780 | A | 7/2007 |
| JP | 2011107510 | A | 6/2011 |
| JP | 2015-178232 | A | 10/2015 |
| JP | 2016161819 | A | 9/2016 |
| JP | 2018159860 | A | 10/2018 |
| JP | 2020-534684 | A | 11/2020 |
| WO | 2021060554 | A1 | 4/2021 |

OTHER PUBLICATIONS

Extended European Search Report issued Jan. 29, 2025 in Application No. 21935240.8.

PCT/JP2021/048730, "English Translation of International Search Report", Mar. 8, 2022, 3 pages.

PCT/JP2021/048730, "English Translation of the International Preliminary Report on Patentability", Oct. 12, 20223, 7 pages.

PCT/JP2021/048730, "English Translation of Written Opinion", Mar. 8, 2022, 5 pages.

PCT/JP2021/048730, "International Preliminary Report on Patentability", Oct. 12, 2023, 7 pages.

PCT/JP2021/048730, "International Search Report and Written Opinion", Mar. 8, 2022, 11 pages.

JP2021-058171, "Notice of Reasons for Refusal with Machine Translation", Jul. 30, 2024, 6 pages.

Communication dated Jun. 21, 2025 in Chinese Application No. 202180094599.8.

* cited by examiner

[Fig. 1]
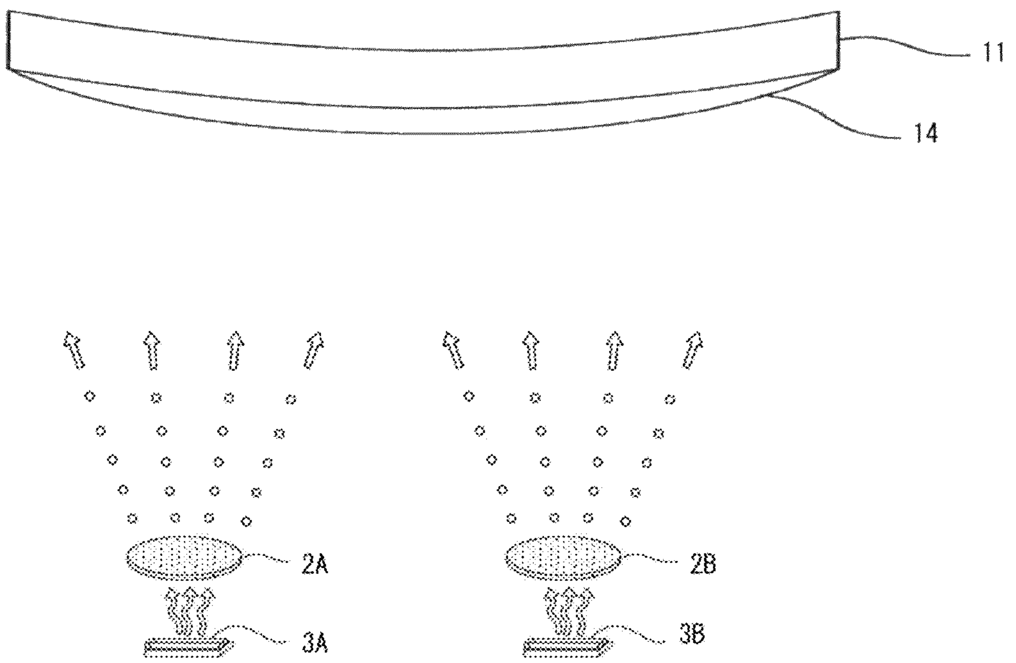
[Fig. 2]
(SPECIFIC EXAMPLE 1)
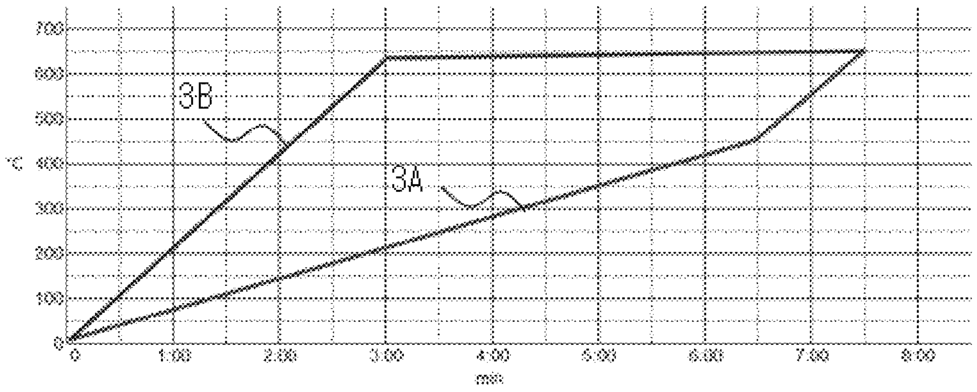

[Fig. 3]
(SPECIFIC EXAMPLE 2)
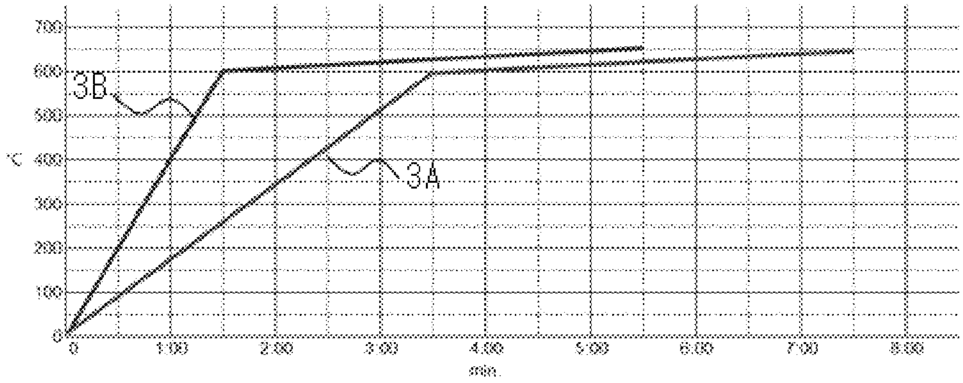
[Fig. 4]
(SPECIFIC EXAMPLE 3)
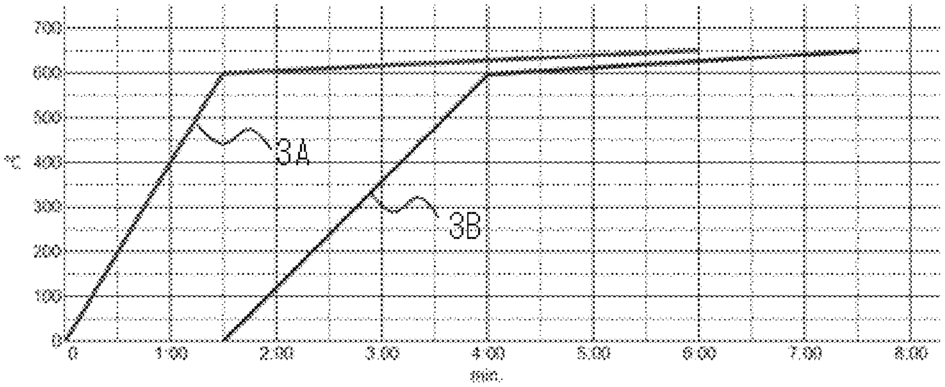

[Fig. 5]
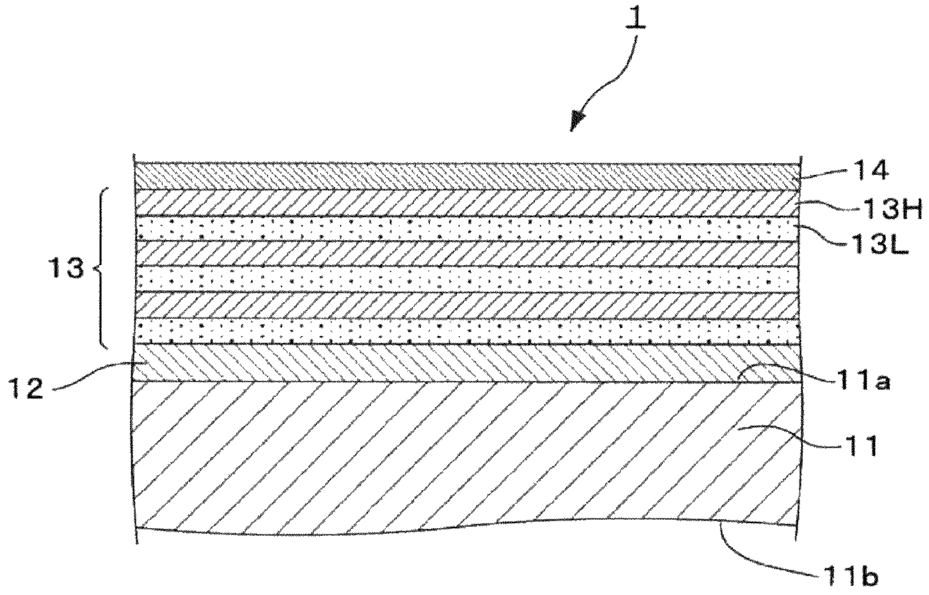

METHOD OF PRODUCING SPECTACLE LENS

CROSS-REFERENCE TO RELATED APPLICATIONS

This application is the National Stage of International Application No. PCT/JP2021/048730, filed Dec. 28, 2021, which claims priority to Japanese Patent Application No. 2021-058171, filed Mar. 30, 2021, and the contents of which are incorporated by reference.

TECHNICAL FIELD

The present disclosure relates to a method of producing a spectacle lens.

BACKGROUND ART

A spectacle lens generally has a configuration in which one or more functional layers are formed on the surface of a lens substrate (for example, refer to PTL 1).

CITATION LIST

Patent Literature

[PTL 1] Japanese Patent Application Publication No. 2003-14904

SUMMARY OF DISCLOSURE

Technical Problem

In an example of PTL 1, a water-repellent layer (a water-repellent thin film in PTL 1) is provided on a plastic lens as a functional layer to produce an optical component that can be used as a spectacle lens. When the water-repellent layer is provided on the spectacle lens, water repellency can be imparted to the spectacle lens. It is preferable for the spectacle lens to have water repellency because adhesion of dust (for example, sweat, fingerprints, etc.) to the surface of the spectacle lens is inhibited and adhered dust is easily removed.

When various properties are imparted to the spectacle lens, the added value of the spectacle lens increases. With respect to this point, the inventors have examined adding a metal component to the water-repellent layer and thus imparting a property exhibited by the metal component to the spectacle lens.

In addition, spectacle users routinely wipe their spectacle lenses in order to remove dust from their surfaces. It is also desirable for spectacle lenses to exhibit little deterioration in properties (that is, excellent durability) even after such a wiping treatment is performed over a long period.

An aspect of one aspect of the present disclosure is to provide a spectacle lens that can exhibit properties exhibited due to water repellency and the metal component contained in the water-repellent layer and having excellent durability in these properties.

Solution to Problem

One aspect of the present disclosure relates to a method of producing a spectacle lens, wherein the spectacle lens has a water-repellent layer, the method including film-forming the water-repellent layer by a heat deposition method and heating a plurality of deposition sources according to different temperature profiles in the film-forming by the heat deposition method, wherein, in the plurality of deposition sources, at least one deposition source contains a water-repellent component, and at least one deposition source contains a metal component (hereinafter simply referred to as a "production method").

In the above production method, film-forming is performed by a heat deposition method in which the plurality of deposition sources are used, and these plurality of deposition sources are heated according to different temperature profiles.

Generally, the metal component and the water-repellent component have different vaporization temperatures, and it is thought that, in deposition by heating according to a single temperature profile, during temperature rise, the water-repellent component that vaporizes at a lower temperature is mainly vaporized first and deposited, and then the metal component that vaporizes at a higher temperature is mainly vaporized and deposited. Accordingly, it is thought that, when the metal component and the water-repellent component are deposited to form a water-repellent layer, the distribution of the metal component and the water-repellent component is uneven in the water-repellent layer, and regarding the water-repellent component unevenly distributed in the water-repellent layer, the water repellency that the spectacle lens can exhibit according to the inclusion of the component will be deteriorated. On the other hand, it is speculated that, regarding the property exhibited by the metal component unevenly distributed in the surface layer part, the durability is low.

On the other hand, it is thought that, in the above production method, since the plurality of deposition sources are heated according to different temperature profiles in the film-forming by the heat deposition method, it is possible to reduce the uneven distribution of the metal component and the water-repellent component in the water-repellent layer. Accordingly, the inventors speculate that it is possible to provide a spectacle lens that can exhibit properties exhibited due to water repellency and the metal component and also has excellent durability in these properties. However, the present disclosure is not limited to the speculations described in this specification.

Advantageous Effects of Disclosure

According to one aspect of the present disclosure, it is possible to produce a spectacle lens that can exhibit properties exhibited due to water repellency and the metal component contained in the water-repellent layer and having excellent durability in these properties.

BRIEF DESCRIPTION OF DRAWINGS

FIG. 1 is a schematic view for illustrating an example of a method of film-forming a water-repellent layer by a heat deposition method.

FIG. 2 shows Specific Example 1 of temperature profiles of heaters 3A and 3B shown in FIG. 1.

FIG. 3 shows Specific Example 2 of temperature profiles of the heaters 3A and 3B shown in FIG. 1.

FIG. 4 shows Specific Example 3 of temperature profiles of the heaters 3A and 3B shown in FIG. 1.

FIG. 5 is a schematic cross-sectional view showing an example of a layer structure of a spectacle lens.

DESCRIPTION OF EMBODIMENTS

Hereinafter, the production method will be described in more detail.

<Water-Repellent Layer>

The spectacle lens has a water-repellent layer. In the present disclosure and this specification, the "water-repellent layer" refers to a layer that contributes to the surface of the spectacle lens exhibiting water repellency or contributes to exhibiting better water repellency than when this layer is not provided.

<Metal Component>

The water-repellent layer contains one, two or more metal components. The spectacle lens produced by the production method can have a function exhibited by a metal component contained in the water-repellent layer, and can also have excellent durability of this function.

In the present disclosure and this specification, the "metal component" is a component containing one or more metals. Examples of existence forms of a metal in the metal component include the form of a metal alone or an alloy, the form of an inorganic compound or an organic compound, and the form of metal ions. In addition, as an example of the metal component, a metal complex may be exemplified.

As the property desired to be imparted to spectacle lenses, a function of inhibiting proliferation of bacteria under the recent circumstances in which the need for antibacterial materials is increasing (that is, an antibacterial property) may be exemplified. In order to make the water-repellent layer function as an antibacterial layer that contributes to imparting the antibacterial property to the spectacle lens, as a desirable metal component, a silver-containing component may be exemplified. In the water-repellent layer formed by depositing the silver-containing component, silver can exist in a plurality of forms. This point also applies to other metals. The inventors thought that at least some of silver can be ionized by oxidation to exhibit an antibacterial property, which contributes to an ability of a water-repellent layer containing silver to function as an antibacterial layer. In addition, in one aspect, examples of metal components to be contained in the water-repellent layer include one or more components containing a metal selected from the group consisting of platinum (Pt), gold (Au), palladium (Pd), mercury (Hg), cadmium (Cd), cobalt (Co), nickel (Ni), copper (Cu), zinc (Zn), titanium (Ti), zirconium (Zr), molybdenum (Mo) and lead (Pb). Forming a water-repellent layer using one or more of the above metal components containing other metals together with a silver-containing component leads to minimizing deterioration of the function exhibited by silver with other metals.

<Water-Repellent Component>

The water-repellent layer contains one, two or more water-repellent components. The spectacle lens produced by the production method can have water repellency exhibited by the water-repellent component contained in the water-repellent layer, and can also have excellent durability of water repellency.

In the present disclosure and this specification, "water-repellent component" refers to a component that contributes to the surface of the layer containing the component exhibiting water repellency or contributes to exhibiting better water repellency than when the component is not contained.

As the water-repellent component, a fluorine-containing component may be exemplified. Examples of existence forms of fluorine in the fluorine-containing component include a form of an inorganic compound or an organic compound, and a form of an organic compound is preferable. That is, as one form of the water-repellent component, a fluorine-containing organic compound may be exemplified.

As an example of the fluorine-containing organic compound m-xylene hexafluoride ($C_6H_4(CF_3)_2$) or the like may be exemplified.

In addition, as the fluorine-containing organic compound, for example, a fluorine-containing organic silane compound represented by the following General Formula (1) may be exemplified.

[C1]

(1)

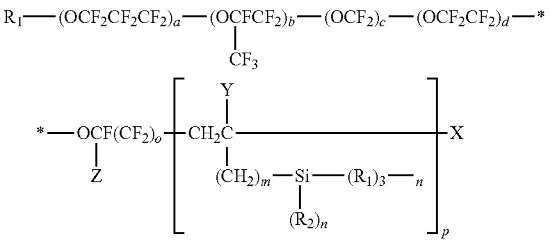

In General Formula (1), Rf is a linear or branched perfluoroalkyl group having 1 to 16 carbon atoms, and preferably $CF_3$—, $c_2f_5$—, or $C_3F_7$—. $R_1$ is a hydrolyzable group, and preferably, for example, a halogen atom, —$OR_3$, —$OCOR_3$, —$OC(R_3)$=$C(R_4)_2$, —ON=$C(R_3)_2$, or —ON=$CR_5$, and more preferably, a chlorine atom, —$OCH_3$, or —$OC_2H_5$. Here, $R_3$ is an aliphatic hydrocarbon group or an aromatic hydrocarbon group, $R_4$ is a hydrogen atom or an aliphatic hydrocarbon group (for example, a lower aliphatic hydrocarbon group), and $R_5$ is a divalent aliphatic hydrocarbon group having 3 to 6 carbon atoms. $R_2$ is a hydrogen atom or a monovalent organic group. The monovalent organic group is preferably an inert group. The monovalent organic group is more preferably a monovalent hydrocarbon group having 1 to 4 carbon atoms. X is an iodine atom or a hydrogen atom, and Y is a hydrogen atom or an alkyl group (for example, a lower alkyl group). Z is a fluorine atom or a trifluoromethyl group. a, b, c, and d are each independently an integer in a range of 0 to 200, and preferably an integer in a range of 1 to 50. e is 0 or 1. m and n are each independently an integer in a range of 0 to 2, and preferably 0. p is an integer of 1 or more, and preferably an integer in a range of 1 to 10.

In addition, the molecular weight (weight average molecular weight Mw) of the fluorine-containing organic silane compound represented by General Formula (1) is not particularly limited, and may be, for example, a range of $5\times10^2$ to $1\times10^5$ or a range of $5\times10^2$ to $1\times10^4$.

In addition, in one aspect, the fluorine-containing organic silane compound represented by General Formula (1) may be a fluorine-containing organic silane compound represented by the following General Formula (2).

[C2]

(2)

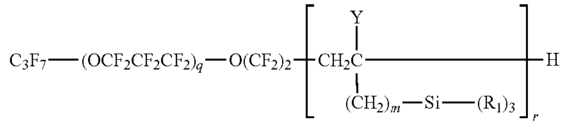

$R_1$, Y, and m in General Formula (2) have the same meanings as in General Formula (1). q is an integer in a range of 1 to 50, and r is an integer in a range of 1 to 10.

<Deposition Source>

In the above production method, a heat deposition method is used as a film-forming method for forming a water-repellent layer. The heat deposition method is a method in which a deposition material is heated and vaporized by heating the internal atmosphere of a device using a heating unit (a heater, etc.) disposed in the deposition device. As described above, it is thought that, when a water-repellent layer is formed by heating and depositing a metal component and a water-repellent component, which generally have different vaporization temperatures, according to a single temperature profile, the distribution of the metal component and the water-repellent component is uneven in the water-repellent layer. On the other hand, in the above production method, a plurality of deposition sources are heated according to different temperature profiles. Accordingly, the inventors speculate that it is possible to reduce the uneven distribution of the metal component and the water-repellent component in the water-repellent layer film-formed by the heat deposition method, and as a result, it is possible to produce a spectacle lens that can exhibit a property exhibited by the water-repellent component (that is, water repellency) and a property exhibited by the metal component (for example, antibacterial properties) and has excellent durability in these properties.

As the deposition source, a deposition source in which one or more metal components and/or one or more water-repellent components are supported on carriers can be used. The plurality of deposition sources used in the production method may include a deposition source containing only one of a metal component and a water-repellent component or may include a deposition source containing both a metal component and a water-repellent component, and may include the former deposition source and the latter deposition source.

As a method of supporting a deposition material (metal component and/or water-repellent component) on a carrier, for example, the following method may be exemplified.

A carrier is impregnated into a solution containing a deposition material. Examples of a method of impregnating a carrier with a solution include a method of injecting or spraying a solution to a carrier and a method of immersing a carrier in a solution. The carrier can be, for example, a porous component, and can be made of, for example, a metal, an alloy, or a ceramic. Specific examples of porous components include a sintered filter. The sintered filter can be a sintered component obtained by sintering a powder material such as a metal powder, an alloy powder, or a ceramic powder. When a carrier is impregnated into a solution and then dried by a known method, the deposition material can be supported on the carrier.

Regarding the water-repellent component, for example, a commercially available liquid water repellent agent can be impregnated with a carrier directly or after being diluted.

Regarding the metal component, a solution containing metal component particles can be impregnated with a carrier. Such a solution can be, for example, an aqueous solution, and can be an aqueous dispersion of metal component particles. The concentration of the metal component in the solution can be, for example, in a range of 1,000 to 10,000 ppm. In the present disclosure and this specification, ppm is based on mass. Here, when two or more metal components are supported on one carrier, the concentration is a total concentration of the two or more metal components. For example, a commercial product that is commercially available as an aqueous dispersion of a metal component can be impregnated with a carrier directly or after being diluted. The particle size of metal component particles can be, for example, 1 nm or more and 10 nm or less or 1 nm or more and 5 nm or less.

The amount of each solution impregnated with a carrier can be, for example, in a range of 0.10 to 5.00 ml.

A total number of deposition sources used in the production method is 2 or more, and can be 2, 3 or 4, and can be, for example, 5 or less. The plurality of deposition sources used in the production method may include two or more deposition sources in which the type and the amount of components are the same and may include two or more deposition sources in which at least one of the type and the amount of component is different.

<Heating of Deposition Source>

In the above production method, a plurality of deposition sources are heated according to different temperature profiles. As described above, it is thought to be possible to reduce the uneven distribution of the metal component and the water-repellent component in the water-repellent layer accordingly. Here, when three or more deposition sources are used, temperature profiles for heating at least two deposition sources may be different temperature profiles, and two or more deposition sources among three or more deposition sources may be heated according to the same temperature profile.

In one aspect, a plurality of deposition sources can be heated in one chamber. For example, using one vacuum deposition device, a plurality of deposition sources can be disposed in the vacuum chamber within this device to deposit the deposition material on a film-forming target surface.

FIG. 1 is a schematic view for illustrating an example of a method of film-forming a water-repellent layer by a heat deposition method. In FIG. 1, 2A and 2B indicate deposition sources, 3A and 3B indicate heaters, 11 indicates a lens substrate, and 14 indicates a film-formed water-repellent layer.

The pressure in the chamber during film-forming may be determined according to the type of the deposition material, and may be, for example, $2\times10^{-2}$ Pa or less.

As the heaters 3A and 3B, for example, a halogen heater and the like can be used. The temperature profile of the heater 3A that heats the deposition source 2A and the temperature profile of the heater 3B that heats the deposition source 2B are set to different temperature profiles. The temperature profile can be set in a control unit provided in the vacuum deposition device. The plurality of different temperature profiles can differ in one or more heating parameters selected from the group consisting of a temperature increase rate, a heating start time and a heating end time.

FIG. 2 to FIG. 4 show specific examples of temperature profiles of the heaters 3A and 3B.

Specific Example 1 shown in FIG. 2 is an example in which temperature profiles of two heaters have different temperature increase rates. For example, when the deposition source 2A heated by the heater 3A contains a water-repellent component, the deposition source 2B heated by the heater 3B contains a metal component, and the water-repellent component is a component that easily vaporizes at a lower temperature than the metal component, if a period in which the temperature increase rate of the heater 3A is slower than the temperature increase rate of the heater 3B is provided, the period during which the metal component is vaporized and the period during which the water-repellent component is vaporized can be set to the same period or the difference between these periods can be reduced. Here, the temperature increase rate for heating by each heater can be the same temperature increase rate from the start to the end of heating in one aspect, or can be changed in two or more stages from the start to the end of heating in another aspect.

Specific Example 2 shown in FIG. 3 is an example in which temperature profiles of two heaters have different temperature increase rates and heating end times. For example, when the deposition source 2A heated by the heater 3A contains a water-repellent component, the deposition source 2B heated by the heater 3B contains a metal component, and the water-repellent component is a component that easily vaporizes at a lower temperature than the metal component, if a period during which the temperature increase rate of the heater 3A is slower than the temperature increase rate of the heater 3B is provided and heating by the heater 3B ends before heating by the heater 3A, the period during which the metal component is vaporized and the period during which the water-repellent component is vaporized can be set to the same period or the difference between these periods can be reduced.

Specific Example 3 shown in FIG. 4 is an example in which temperature profiles of two heaters have different heating start times and temperature increase rates. For example, when both the deposition source 2A heated by the heater 3A and the deposition source 2B heated by the heater 3B contain a metal component and a water-repellent component, according to Specific Example 3, since the period during which the water-repellent component is vaporized from the deposition source 2A and the period during which the water-repellent component is vaporized from the deposition source 2B can be made different, and the period during which the metal component is vaporized from the deposition source 2A and the period during which the metal component is vaporized from the deposition source 2B can be made different, it is possible to reduce the uneven distribution of the water-repellent component and the metal component in the formed water-repellent layer.

However, Specific Examples 1 to 3 are only examples, and the present disclosure is not limited to such examples.

The maximum heating temperature in the temperature profile may be determined according to the type of the deposition material, and can be, for example, 100° C. or higher and 750° C. or lower, but the temperature is not limited to this range.

The film thickness of the water-repellent layer thus formed can be, for example, 30 nm or less, 25 nm or less, 20 nm or less or 15 nm or less. The film thickness of the water-repellent layer can be, for example, 5 nm or more or 10 nm or more. In addition, a contact angle with respect to water on the surface of the water-repellent layer can be, for example, 100° or more and 120° or less. The water-repellent layer can be provided, for example, as the outermost layer on one side or both sides of the spectacle lens.

<Example of Layer Structure of Spectacle Lens>

In the above production method, the water-repellent layer can be provided directly on the surface of the lens substrate or indirectly with another layer therebetween.

FIG. 5 is a schematic cross-sectional view showing an example of a layer structure of the spectacle lens produced by the production method. A spectacle lens 1 shown in FIG. 5 has a hard coat layer 12 on one surface 11*a* (for example, an object-side surface) of the lens substrate 11 and a multilayer film 13 thereon. The multilayer film 13 is a film in which low-refractive-index layers 13L and high-refractive-index layers 13H are alternately laminated. The water-repellent layer 14 is provided on the surface of the multilayer film. For the water-repellent layer 14, the above description can be referred to.

(Lens Substrate)

The lens substrate of the spectacle lens can be a plastic lens substrate or a glass lens substrate. The glass lens substrate can be, for example, a lens substrate made of inorganic glass. The lens substrate is preferably a plastic lens substrate because it is light-weight, hard to break and easy to handle. Examples of plastic lens substrates include styrene resins such as (meth)acrylic resins, allyl carbonate resins such as a polycarbonate resin, allyl resin, and diethylene glycol bisallyl carbonate resin (CR-39), vinyl resins, polyester resins, polyether resins, urethane resins obtained by reacting an isocyanate compound and a hydroxy compound such as diethylene glycol, thiourethane resins obtained by reacting an isocyanate compound and a polythiol compound, and a cured product obtained by curing a curable composition containing a (thio)epoxy compound having one or more disulfide bonds in the molecule (generally referred to as a transparent resin). As the lens substrate, an undyed substrate (colorless lens) may be used or a dyed substrate (dyed lens) may be used. The refractive index of the lens substrate can be, for example, about 1.60 to 1.75. However, the refractive index of the lens substrate is not limited to the above range, and may be within the above range or may be above or below outside the above range. In the present disclosure and this specification, the refractive index refers to a refractive index for light having a wavelength of 500 nm. In addition, the lens substrate may be a lens having refractive power (so-called prescription lens) or a lens having no refractive power (so-called non-prescription lens).

The spectacle lens may include various lenses such as a single focus lens, a multifocal lens, and progressive power lens. The type of the lens is determined by the surface shape of both sides of the lens substrate. In addition, the surface of the lens substrate may be a convex surface, a concave surface, or a flat surface. In a general lens substrate and spectacle lens, the object-side surface is a convex surface, and the eyeball-side surface is a concave surface. However, the present disclosure is not limited thereto.

(Multilayer Film)

As one form of the multilayer film, an inorganic layer may be exemplified. In the present disclosure and this specification, the "inorganic layer" is a layer containing an inorganic substance and preferably a layer containing an inorganic substance as a main component. Here, the main component is a component whose proportion is the largest in the layer and is a component whose proportion is generally about 50 mass % to 100 mass %, and additionally about 90 mass % to 100 mass % with respect to the mass of the layer. The same applied to main components to be described below. The inorganic layer can be a layer that is directly laminated on the surface of the lens substrate or a layer that is indirectly laminated on the surface of the lens substrate with one or more other layers therebetween. Examples of other layers include one or more known layers such as a cured layer of a curable composition generally called a hard coat layer and a primer layer provided for improving adhesion. The types and film thicknesses of these layers are not particularly limited, and can be determined according to desired functions and optical properties of the spectacle lens.

When the multilayer film is an inorganic layer, that is, an inorganic multilayer film, a water-repellent layer can be provided on the uppermost inorganic layer (that is, the inorganic layer at a position most distant from the lens substrate). Examples of such an inorganic multilayer film include a multilayer film including one or more high-refractive-index layers and one or more low-refractive-index layers. Such a multilayer film can be an antireflection film having a property of preventing reflection of light having a specific wavelength or light in a specific wavelength range or a reflection film having a property of reflecting light having a specific wavelength or light in a specific wavelength range. In the present disclosure and this specification, “high” and “low” for the “high refractive index” and “low refractive index” are relative terms. That is, the high-refractive-index layer is a layer having a higher refractive index than the low-refractive-index layer included in the same multilayer film. In other words, the low-refractive-index layer is a layer having a lower refractive index than the high-refractive-index layer included in the same multilayer film. The refractive index of the high-refractive-index material constituting the high-refractive-index layer can be, for example, 1.60 or more (for example, in a range of 1.60 to 2.40), and the refractive index of the low-refractive-index material constituting the low-refractive-index layer can be, for example, 1.59 or less (for example, in a range of 1.37 to 1.59). However, as described above, since “high” and “low” for the high refractive index and the low refractive index are relative terms, the refractive indices of the high-refractive-index material and the low-refractive-index material are limited to the above ranges.

Specifically, examples of high-refractive-index materials for forming a high-refractive-index layer include mixtures of one, two or more oxides selected from the group consisting of zirconium oxide (for example, $ZrO_2$), tantalum oxide (for example, $Ta_2O_5$), titanium oxide (for example, $TiO_2$), aluminum oxide (for example, $Al_2O_3$) , yttrium oxide (for example, $Y_2O_3$), hafnium oxide (for example, $HfO_2$), and niobium oxide (for example, $Nb_2O_5$). On the other hand, examples of low-refractive-index materials for forming a low-refractive-index layer include mixtures of one, two or more oxides or fluorides selected from the group consisting of silicon oxide (for example, $SiO_2$), magnesium fluoride (for example, $MgF_2$) and barium fluoride (for example, $BaF_2$). In the above examples, for convenience, oxides and fluorides are indicated by stoichiometric compositions, but those in which oxygen or fluorine is deficient or excessive from the stoichiometric composition can be used as the high-refractive-index material or the low-refractive-index material.

Preferably, the high-refractive-index layer is a film containing a high-refractive-index material as a main component, and the low-refractive-index layer is a film containing a low-refractive-index material as a main component. Such a film (for example, a deposition film) can be formed by film-formation using a film-forming material (for example, a deposition material) containing the high-refractive-index material or the low-refractive-index material as a main component. Films and film-forming materials may contain impurities that are inevitably mixed, and may contain other components to the extent that functions of the main component are not impaired, for example, other inorganic substances and known additive components that assist film-formation. Film formation can be performed by a known film-forming method, and in consideration of ease of film-formation, film-formation is preferably performed by deposition and more preferably performed by vacuum deposition. The antireflection film can be, for example, a multilayer film in which a total of 3 to 10 layers of high-refractive-index layers and low-refractive-index layers are alternately laminated. The film thickness of the high-refractive-index layer and the film thickness of the low-refractive-index layer can be determined according to the layer structure. Specifically, a combination of layers included in the multilayer film and the film thickness of each layer can be determined by an optical design simulation using a known technique based on the refractive index of the film-forming material for forming a high-refractive-index layer and a low-refractive-index layer, and a desired reflection property and transmission property for the spectacle lens according to provision of the multilayer film. In addition, the multilayer film may include a layer containing a conductive oxide as a main component (conductive oxide layer), and preferably one or more layers of a deposition film of a conductive oxide formed by deposition using a deposition material containing a conductive oxide as a main component at an arbitrary position. The film thickness of each of the high-refractive-index layer and the low-refractive-index layer included in the multilayer film can be, for example, 3 to 500 nm, and the total thickness of the multilayer film can be, for example, 100 to 900 nm. In the present disclosure and this specification, the film thickness is a physical film thickness.

In one aspect, the spectacle lens produced by the production method can have a water-repellent layer on the surface on the inorganic layer. For example, the water-repellent layer can be a layer that is directly laminated on the surface of the multilayer film or a layer that is indirectly laminated on the surface of the multilayer film with one or more other layers therebetween. For the other layers, the above description can be referred to.

The water-repellent layer can be formed on at least one surface of the lens substrate or can be formed on both surfaces thereof. For example, the water-repellent layer can be positioned on the object side of the spectacle lens, the water-repellent layer can be positioned on the eyeball side of the spectacle lens, and the water-repellent layer can be positioned on the object side and the eyeball side of the spectacle lens. When the water-repellent layer is positioned on both sides of the spectacle lens, the water-repellent layer on the object side and the water-repellent layer on the eyeball side can be the same water-repellent layer or different water-repellent layers. In the present disclosure and this specification, the “eyeball side” is the side of the surface positioned on the eyeball side when spectacles having spectacle lenses are worn by a wearer. The “object side” is the side of the surface opposite thereto, that is, the side of the surface positioned on the object side when spectacles having spectacle lenses are worn by a wearer.

When the spectacle lens produced by the production method is incorporated into a frame, it is possible to produce spectacles having the spectacle lens. Regarding the spectacles, a known technique can be applied to the configuration of the frame and the like.

EXAMPLES

Hereinafter, the present disclosure will be described in more detail with reference to examples. However, the present disclosure is not limited to embodiments shown in examples.

In the following description, the $SiO_2$ layer is a deposition film-formed using silicon oxide as a deposition material, and the $ZrO_2$ layer is a deposition film-formed using zirconium oxide as a deposition material. Each deposition material is a deposition material composed of only the described oxides, except for inevitably mixed impurities.

Example 1

<Production of Lens Substrate With Hard Coat Layer>

A hard coat liquid containing inorganic oxide particles and a silicon compound was applied to the entire object-side surface (convex surface) of a plastic lens substrate produced using a spectacle lens monomer (MR8 commercially available from Mitsui Chemicals, Inc.) by spin coating, and cured by heating in a heating furnace with an internal temperature of 100° C. for 60 minutes, and thereby a single hard coat layer having a film thickness of 3 μm was formed.

<Production of Multilayer Antireflection Film>

Next, the lens substrate with the hard coat layer formed thereon was put into a vacuum deposition device, and a multilayer antireflection film in which a total of 7 layers including "$SiO_2$ layer/$ZrO_2$ layer/$SiO_2$ layer/$ZrO_2$ layer/$SiO_2$ layer/$ZrO_2$ layer/$SiO_2$ layer" (total thickness: about 400 to 600 nm) was laminated on the entire hard coat layer surface by a vacuum deposition method was formed. The notation "/" indicates that the part described in the left of "/" and the part described to the right are directly laminated. This point also applies to the following description.

Thereby, a spectacle lens having a layer structure of "lens substrate/hard coat layer/multilayer antireflection film (inorganic layer)" was produced.

<Film-Formation of Water-Repellent Layer>

(Production of Deposition Source)

As a water-repellent component solution, a water repellent agent (product name: KY-130, containing a fluorine-containing organic silane compound, commercially available from Shin-Etsu Silicones) was used.

As a metal component solution, an aqueous dispersion containing silver particles having a particle size of 2 to 5 nm at a concentration of 5,000 ppm was prepared.

A disk-shape sintered filter (material: SUS) with a diameter of 18 mm was used as a deposition source carrier, and two deposition sources were produced by the following method.

A carrier injected with the water-repellent component solution in the amount shown in Table 1 was dried in a drying furnace with an internal temperature of 50° C. for 1 hour to produce a first deposition source.

A carrier injected with the metal component solution in the amount shown in Table 1 was dried in a drying furnace with an internal temperature of 50° C. for 1 hour to produce a second deposition source.

(Film-Formation of Water-Repellent Layer by Heat Deposition Method)

As shown in FIG. 1, in the vacuum chamber of the vacuum deposition device, the spectacle lens with the multilayer antireflection film-formed thereon and the deposition source were disposed. The first deposition source in which a fluorine-containing organic silane compound serving as a water-repellent component was supported on a carrier was disposed as the deposition source 2A, and the second deposition source in which silver particles serving as a metal component were supported on a carrier was disposed as the deposition source 2B. Each deposition source was mounted on a molybdenum boat (not shown in FIG. 1) and disposed in the vacuum chamber. The pressure in the vacuum chamber was set to $2\times10^{-2}$ Pa or less, and heating was performed by the heater 3A and the heater 3B (both a halogen heater) according to the temperature profile of Specific Example 1 in FIG. 2. Specifically, in the temperature profile of the heater 3A, the temperature was raised to 400° C. over 6 minutes and the temperature was then raised from 400° C. to 650° C. over 1 minute and 30 seconds. In the temperature profile of the heater 3B, the temperature was raised to 630° C. over 3 minutes and 30 seconds and the temperature was then raised from 630° C. to 650° C. over 4 minutes. When heating was performed in this manner, the water-repellent component and the metal component could be heated and vaporized, and a deposition film in which the water-repellent component and the metal component were deposited on the surface of the multilayer antireflection film could be formed.

Accordingly, a water-repellent layer containing the water-repellent component and the metal component and having a film thickness of 10 to 20 nm was film-formed on the surface of the multilayer antireflection film.

According to the above processes, a spectacle lens of Example 1 having a layer structure of "lens substrate/hard coat layer/multilayer antireflection film (inorganic layer)/water-repellent layer" was produced.

Example 2

A spectacle lens of Example 2 was produced by the method described in Example 1 except that the amount of the metal component (silver particles) solution injected into the carrier when the second deposition source was produced was changed to the value shown in Table 1.

Comparative Example 1

A spectacle lens of Comparative Example 1 was produced by the method described in Example 1 except that only one deposition source was used and the deposition source was heated according to the temperature profile of the heater 3A of Example 1.

The deposition source was produced by the following method. The same carrier, metal component solution and water-repellent component solution as those in Example 1 were used. The metal component solution in the amount shown in Table 1 was injected into the carrier, and then dried in a drying furnace with an internal temperature of 50° C. for 1 hour, and subsequently, the water-repellent component solution in the amount shown in Table 1 was injected and then dried in a drying furnace with an internal temperature of 50° C. for 1 hour to produce a deposition source.

For the spectacle lenses of the examples and comparative example, an antibacterial property test and contact angle measurement were performed on spectacle lenses without a friction wear treatment (initial) and with a friction wear treatment by the following methods.

The friction wear treatment was performed by the following method. An eraser cut to a size of 19 mm×24 mm and wrapped with lens wiping paper (Dusper commercially available from Ozu Corporation) was attached to a reciprocating friction wear tester (Tribogear 30S, commercially available from Yamato Scientific Co., Ltd.) as a friction wear member. The surface of the water-repellent layer of the spectacle lens was rubbed back and forth 1,000 or 5,000 times with a friction wear member with a load of 2 kg.

[Antibacterial Property Test]

The antibacterial property test was performed according to JIS Z 2801: 2012. In the antibacterial property test of the spectacle lenses of the examples and comparative example, a spectacle lens produced in the same method as the spectacle lens of each example or comparative example except that the water-repellent layer was not formed was used as a reference sample.

A 50 mm×50 mm test piece (a test piece cut out from each spectacle lens of the examples and comparative example and its reference sample) was placed in a sterilized petri dish, and 0.4 mL of a bacteria solution containing $1.0\times10_5$ to $4.0\times10_5$ test bacteria (*Escherichia coli*) was then added dropwise to the center of the test piece, and covering with a polyethylene film cut to 40 mm×40 mm was performed. After culturing was performed in the petri dish at a relative humidity of 90% or more for 24 hours, the number of viable bacteria per 1 $cm^2$ was measured, and the following antibacterial activity value was calculated.

$$\text{antibacterial activity value}=Ut-At\geq 2.0$$

Ut: average value of the logarithmic value of the number of viable bacteria per 1 $cm^2$ after the unprocessed test piece (reference sample) was cultured for 24 hours At: average value of the logarithmic value of the number of viable bacteria per 1 $cm^2$ after the antibacterial treated test piece (example or comparative example sample) was cultured for 24 hours The Society of International sustaining growth for Antimicrobial Articles (SIAA) defines that the product has an antibacterial effect if the antibacterial activity value is 2 or more. Therefore, the antibacterial properties of the spectacle lenses of Example 1, Example 2 and Comparative Example 1 were determined from the antibacterial activity value obtained above based on the following determine criteria.

OK: the antibacterial activity value was 2.0 or more

NG: the antibacterial activity value was less than 2.0

[Measurement of Contact Angle]

Using a CA-D model (commercially available from Kyowa Interface Science Co., Ltd.) as a contact angle meter, in a measurement environment with an atmosphere temperature of 25° C., a water droplet with a diameter of 2 mm was formed at the needle tip, and this was brought into the top of the convex surface of the water-repellent layer of the spectacle lens to form a droplet. The angle between the droplet and the surface generated in this case was measured and used as a static contact angle. The contact angle was measured within 10 seconds after the water droplet was brought into contact with the spectacle lens in order to minimize measurement errors due to water evaporation. The static contact angle 0 was determined by the following formula, where r is the radius of the water droplet (radius of a part in which water droplets were brought into contact with the surface of the spectacle lens) and h is the height of the water droplet.

$$\theta=2\times\tan^{-1}(h/r)$$

The spectacle lenses of Example 1 and Example 2 were spectacle lenses in which a water-repellent layer was film-formed by a heat deposition method by heating a plurality of deposition sources according to different temperature profiles.

On the other hand, the spectacle lens of Comparative Example 1 was a spectacle lens in which a water-repellent layer was film-formed using a single deposition source.

Based on the results shown in Table 1, it was confirmed that the spectacle lenses of Example 1 and Example 2 exhibited antibacterial properties exhibited by the metal component both at the initial stage and after the friction wear treatment, and the spectacle lenses of Example 1 and Example 2 had a larger contact angle value and better water repellency both at the initial stage and after the friction wear treatment than the spectacle lens of Comparative Example 1.

The spectacle lenses of Example 1 and Example 2 were subjected to the antibacterial property test by the method described above using Staphylococcus aureus as test bacteria, and the evaluation result was "OK" in all at the initial stage, after 1,000 repetitions of the friction wear treatment and after 5,000 repetitions of the friction wear test.

Finally, the above respective aspects are summarized.

According to one aspect, there is provided a method of producing a spectacle lens, wherein the spectacle lens has a water-repellent layer, the method including film-forming the water-repellent layer by a heat deposition method and heating a plurality of deposition sources according to different temperature profiles in the film-forming by the heat deposition method, wherein, in the plurality of deposition sources, at least one deposition source contains a water-repellent component, and at least one deposition source contains a metal component.

According to the production method, it is possible to produce a spectacle lens that can exhibit properties exhibited due to water repellency and the metal component contained in the water-repellent layer and having excellent durability in these properties.

In one aspect, the metal component may contain a silver-containing component.

In one aspect, the silver-containing component may be silver particles.

In one aspect, the water-repellent component may be a fluorine-containing component.

TABLE 1

| | First deposition source | | Second deposition source | | Antibacterial property | | | Contact angle (degrees) | |
|---|---|---|---|---|---|---|---|---|---|
| | | | | | | After friction wear treatment | After friction wear treatment | | After friction wear treatment |
| | Component | Injection amount | Component | Injection amount | Initial | 1,000 times | 5,000 times | Initial | 5,000 times |
| Example 1 | Water-repellent component | 0.25 ml | Metal component | 1.5 ml | OK | OK | OK | 108 | 106 |
| Example 2 | Water-repellent component | 0.25 ml | Metal component | 2.5 ml | OK | OK | OK | 108 | 106 |
| Comparative Example 1 | Water-repellent component | 0.25 ml | — | — | OK | NG | NG | 95 | 83 |
| | Metal component | 0.25 ml | — | — | | | | | |

In one aspect, the fluorine-containing component may be a fluorine-containing organic silane compound.

In one aspect, in the different temperature profiles, one or more heating parameters selected from the group consisting of a temperature increase rate, a heating start time and a heating end time may be different.

In one aspect, the plurality of deposition sources may include a deposition source containing only one of the metal component and the water-repellent component.

In one aspect, the plurality of deposition sources may include a deposition source containing only the metal component among the metal component and the water-repellent component and a deposition source containing only the water-repellent component among the metal component and the water-repellent component.

Two or more of various aspects and various forms described in this specification can be combined in arbitrary combinations.

The embodiments disclosed herein are only examples in all respects and should not be considered as restrictive. The scope of the present disclosure is not limited to the above description, but is defined by the scope of claims, and is intended to encompass equivalents to the scope of claims and all modifications within the scope of the claims.

INDUSTRIAL APPLICABILITY

One aspect of the present disclosure is beneficial in the field of producing spectacle lenses and spectacles.

The invention claimed is:

1. A method of producing a spectacle lens, wherein the spectacle lens has a water-repellent layer, the method comprising:

film-forming the water-repellent layer by a heat deposition method, wherein the film-forming the water-repellant layer by the heat deposition method comprises:

heating a first deposition source, which comprises a silver-containing component and a fluorine-containing water-repellent component, by a first heater, and heating a second deposition source, which comprises a silver-containing component and a fluorine-containing water-repellent component, by a second heater, and wherein a heating start time and a temperature increase rate of the first heater are different from a heating start time and a temperature increase rate of the second heater.

2. The method of producing a spectacle lens according to claim 1, wherein the silver-containing component of at least one of the first deposition source or the second deposition source is silver particles.

3. The method of producing a spectacle lens according to claim 2, wherein the fluorine-containing water-repellent component of at least one of the first deposition source or the second deposition source is a fluorine-containing organic silane compound.

4. The method of producing a spectacle lens according to claim 1, wherein the fluorine-containing water-repellent component of at least one of the first deposition source or the second deposition source is a fluorine-containing organic silane compound.

* * * * *